Patented Dec. 28, 1943

2,337,922

UNITED STATES PATENT OFFICE 2,337,922

CONDENSATION PRODUCT AND METHOD OF PREPARING SAME

Mathias Pier, Heidelberg, and Friedrich Christmann, Ludwigshafen-on-the-Rhine, Germany; vested in the Alien Property Custodian No Drawing. Original application April 17, 1933, Serial No. 666,542. Divided and this application April 29, 1942, Serial No. 440,984. In Germany April 20, 1932

17 Claims. (Cl. 260—592)

The present invention relates to the production of improved oils for lubricating purposes and, especially of low pour point oils.

We have found that the setting point of oils is lowered by the addition of even small amounts of products which are obtainable by the condensation of oxygen derivatives of aliphatic hydrocarbons of high molecular weight above 170, preferably more than 200, in which the oxygen is connected by two linkages with a carbon atom which in turn is in direct combination with only one further carbon atom, together with other organic compounds, advantageously cyclic hydrocarbons or olefines or mixtures of these substances.

As the oxygen derivative initial material may be mentioned acid chlorides of carboxylic acids having a molecular weight above 200, in particular fatty acids, such as stearic acid, oleic acid, palmitic acid and montanic acid, or the corresponding anhydrides, or keto acids. Oxidation products, containing carboxyl groups, of paraffin waxes are also suitable.

Of special advantage are the acid chlorides which are prepared in the usual manner by treatment of the acids or their salts with agents capable of replacing organic hydroxy groups by chlorine, for example thionyl chloride, phosgene, sulphuryl chloride, phosphorus oxychloride, phosphorus trichloride or phosphorus pentachloride. The acid chlorides are then condensed in the presence of condensing agents such as aluminum chloride, zinc chloride, iron chloride, boron fluoride, phosphorus oxychloride, active aluminum or zinc dust.

The temperatures employed for the condensation preferably range between 30 and 120° C. and the condensation is preferably carried on to such an extent that the final condensation products have a molecular weight of more than 1000.

The condensation is advantageously carried out in the presence of substances having a condensing action and presenting a large inner surface, such as bleaching earths or active silica, in admixture with said other condensing agents. The condensation products may also be subjected to a subsequent treatment with these substances. In some cases, as for example, when using agents having a strong condensing action, it is preferable to carry out the reaction with the simultaneous addition of compounds retarding the reaction, such as zinc oxide, soda, calcium carbonate or ammonia.

Said acid chlorides are condensed with solid or liquid hydrocarbon products, such as tars, mineral oils, their distillation, extraction and cracking products or destructive hydrogenation products of carbonaceous material. It is of especial advantage to employ those comprising hydrocarbons of unsaturated character; liquid olefines which have been obtained from paraffinic hydrocarbons, for example by cracking, may be employed. The condensation is advantageously effected with cyclic hydrocarbons. As such may be mentioned in particular naphthalene or other mineral coil tar fractions, such as crude benzene, middle oil or anthracene oil, as well as other products of an aromatic nature such as are obtained for example by destructive hydrogenation, preferably at temperatures of the upper part of the temperature range suitable for this reaction which treatment is called "aromatization," or by dehydrogenation. Olefines, such as ethylene, propylene or butylene, in the form of cracking gases may also be brought into reaction during the condensation.

The condensation products obtained according to the present invention have the appearance and the consistency of waxes.

The amounts of the resulting products to be added for the purpose of reducing the setting point may vary within wide limits, as for example between 0.1 and 10 per cent. Even lubricating oils, gear oils or gear grease having very high setting points are considerably improved by the addition.

The condensation products prepared according to the present invention may be added to the lubricating oils also in larger amounts, as for example in amounts of 20 or 30 or 40 per cent or even more, whereby the viscosity index of the said oils is considerably improved.

The following examples will further illustrate the nature of this invention but the invention is not restricted to these examples. The parts are by weight.

*Example 1*

Stearic acid is converted, by treatment with thionyl chloride at 80° C., into stearic acid chloride. 100 parts of the latter are dissolved in 100 parts of illuminating petroleum and, after the addition of 20 parts of naphthalene and 7 parts of aluminum chloride, are kept at about 30° C. for 24 hours, and then for from about 1 to 2 hours at 90° C. The resulting condensation product is freed from aluminum chloride by centrifuging and distilled in vacuo. 85 parts of a waxy product are obtained as the distillation residue. If this be added in an amount of 0.5 per cent to a German machine oil having a setting point of ∓0° C., the setting point is lowered by about 25° C.

Example 2

95 parts of a gear oil are mixed with 5 parts of a synthetic oil prepared as described in Example 1. In this manner a gear oil is produced which remains soft or liquid even at low temperatures, whereby the lubricating capacity of the gear oil as well as its capacity of facilitating the control of the driving gear is increased.

This application is a division of application Serial No. 666,542, filed April 17, 1933, now Patent No. 2,287,901.

We claim:

1. The process of preparing waxy condensation products having the property of reducing the setting point of viscous hydrocarbon oils which comprises chemically condensing the acid chloride of a carboxylic acid having a molecular weight of more than 200 with a from solid-to-liquid hydrocarbon product.

2. The process of preparing waxy condensation products having the property of reducing the setting point of viscous hydrocarbon oils which comprises chemically condensing the acid chloride of a carboxylic acid having a molecular weight of more than 200 with a from solid-to-liquid hydrocarbon product and obtaining from the reacted mass a condensation product having a molecular weight of more than 1000.

3. The process of preparing waxy condensation products having the property of reducing the setting point of viscous hydrocarbon oils which comprises condensing the acid chloride of a carboxylic acid selected from the group consisting of stearic acid, oleic acid, palmitic acid and montanic acid with a from solid-to-liquid hydrocarbon product selected from the group consisting of liquid olefins and aromatic hydrocarbons.

4. The process of preparing waxy condensation products having the property of reducing the setting point of viscous hydrocarbon oils which comprises chemically condensing the chloride of a fatty acid having a molecular weight of more than 200 with an aromatic hydrocarbon product and obtaining from the reacted mass a condensation product having a molecular weight of more than 1000.

5. The process of preparing waxy condensation products having the property of reducing the setting point of viscous hydrocarbon oils which comprises condensing the acid chloride of a carboxylic acid having a molecular weight of more than 200 with a from solid-to-liquid hydrocarbon product selected from the group consisting of liquid olefins and aromatic hydrocarbons at a temperature of about 30° C. to 120° C. in the presence of a condensing agent.

6. The process of preparing waxy condensation products having the property of reducing the setting point of viscous hydrocarbon oils which comprises chemically condensing the chloride of a fatty acid having a molecular weight of more than 200 with an aromatic hydrocarbon at a temperature of about 30° C. to 120° C. in the presence of aluminum chloride as condensing agent and obtaining from the reacted mass a condensation product having a molecular weight of more than 1000.

7. The process of preparing waxy condensation products having the property of reducing the setting point of viscous hydrocarbon oils which comprises chemically condensing about 100 parts of stearic acid chloride with about 20 parts of naphthalene in the presence of about 7 parts of aluminum chloride, keeping the temperature at about 30° C. for about 24 hours and then for about 1-2 hours at 90° C., freeing the resulting condensation product from aluminum chloride and distilling said product in vacuo to obtain about 85 parts of waxy product as distillation residue.

8. In the process of condensing an acid chloride of a carboxylic acid with a from solid-to-liquid hydrocarbon product having double bonds, in the presence of a condensing agent, the improvement which comprises using an acid chloride of a carboxylic acid having a molecular weight of more than 200 and obtaining from the reacted mass a waxy product having the property of reducing the setting point of viscous hydrocarbon oils.

9. In the process of condensing an acid chloride of a carboxylic acid with a from solid-to-liquid hydrocarbon product having double bonds, in the presence of a condensing agent, the improvement which comprises using an acid chloride of an aliphatic carboxylic acid having a molecular weight of more than 200 and an aromatic hydrocarbon product as the starting materials and obtaining from the reacted mass a waxy product having a molecular weight of more than 1000.

10. Process according to claim 4 in which the aromatic hydrocarbon product is a mineral coal tar fraction.

11. Process according to claim 4 in which at least 2 mols of the fatty acid chloride are used and 1 mol of aromatic hydrocarbon product is used.

12. Process according to claim 5 followed by freeing the resulting condensation product from the condensing agent and distilling the condensation product in vacuo to obtain a distillation residue having a molecular weight of more than 1,000.

13. Process according to claim 6 in which about 2 mols of fatty acid chloride are used and about 1 mol of aromatic hydrocarbon is used.

14. The product of the process defined in claim 1.

15. A condensation product of the chloride of a fatty acid having a molecular weight of more than 200 with an aromatic hydrocarbon, said condensation product having a molecular weight of more than 1,000.

16. A waxy condensation product having a molecular weight of more than 1,000 and having the property of reducing the setting point of hydrocarbon lubricating oils, said condensation product being derived by the process defined in claim 6.

17. Product made by the process defined in claim 7.

MATHIAS PIER.
FRIEDRICH CHRISTMANN.